(No Model.)
P. G. HUBERT.
WATER CLOSET TANK.
No. 337,405. Patented Mar. 9, 1886.
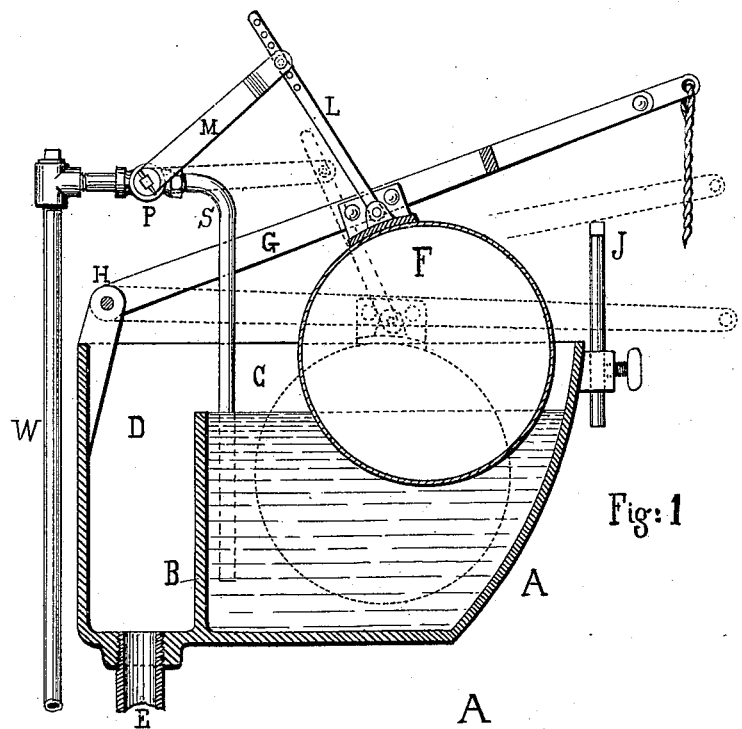
Fig: 1
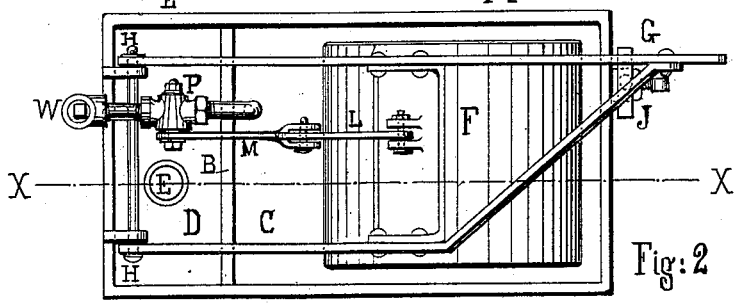
Fig: 2
WITNESSES:
Barbara Jane Reeve
C. G. Hubert
INVENTOR
P. Gengembre Hubert
BY
H. Gengembre Hubert
ATTORNEY

UNITED STATES PATENT OFFICE.

PHILIPPE G. HUBERT, OF NEW YORK, N. Y.

WATER-CLOSET TANK.

SPECIFICATION forming part of Letters Patent No. 337,405, dated March 9, 1886.

Application filed November 30, 1885. Serial No. 184,292. (No model.)

*To all whom it may concern:*

Be it known that I, PHILIPPE GENGEMBRE HUBERT, of the city of New York, in the county of New York and State of New York, have invented a new and useful Improvement in Water-Closet Tanks, of which the following is a specification.

My invention relates to that class of tanks which are used for supplying water to the bowl of closets, and which are known as "flushing-tanks."

The object of my invention is to obtain a flushing-tank which will deliver at each pull a definite quantity of water, which quantity can be previously determined and regulated at will to suit the kind of closet used, the supply of water, or other circumstances. I accomplish this object in the following manner, reference being had to the accompanying drawings, forming part of this specification, in which—

Figure 1 represents a sectional elevation through the line X X, Fig. 2, of my improved water-closet tank; and Fig. 2 is a top view of the same.

A is a tank having an unperforated partition or dam, B, effectually dividing the tank A into two parts, the part C, having no outlets whatever and being perfectly water-tight, to be used as a tank or reservoir for water, and in which said water is kept automatically at a constant level nearly as high as but not overflowing the dam D. The other part, D, has at or near its bottom an opening and pipe, E, entirely unobstructed by any valves, siphons, or stop-cocks, for conducting any water which may be thrown into said part D to the bowl of the water-closet.

F is a float of such dimensions and shape that, besides the submerged portion thereof, when floating it has a large capacity out of water. This part of the float F out of water is intended to displace a like bulk of water when the float is forcibly sunk or pushed down in the water, for the purpose hereinafter explained.

G is a lever pivoted at fixed points H H, resting on and fastened to the float F, and provided with a pull rope, chain, or rod, I, for imparting to it a downward motion when water is to be delivered by the tank.

J is an adjustable stop for limiting the downward motion of the lever G, and by thus arresting it at any given point acts as a regulator to determine the amount of water which shall be delivered at each pull.

The link L, adjustable in length, is used for connecting the float F with the arm M of the water stop-cock P.

S is the pipe from the stop-cock P to the part C of the tank A.

W is the water-supply-pipe.

E is the delivery-pipe, leading from and draining the part D of the tank A to the part of the closet where water is required. This pipe E is entirely unobstructed with valves, siphons, or stop-cocks.

The operation of my improved water-closet tank is as follows: The link L being properly adjusted the stop-cock P is shut when all the working parts are in the positions represented by full lines in my drawings, and the water-level in the part C of the tank A being almost as high as the top of the dam B. When water is required, a pull on the cord I will lower the lever G. The float F being forcibly pushed down in the water will cause a certain amount of water, equal to the bulk displaced by the float F, to overflow over the dam B into the part D of the tank A, and through the pipe E to the bowl of the water-closet. When the float F is pushed down as far as it can go, as indicated by dotted lines in Fig. 1, the tank will deliver the maximum amount of water; but when the adjustable stop J is set, as represented in Fig. 1, so as to arrest the lever in its downward motion, the float F, by not being immersed to its full capacity, will only overflow a quantity of water equal to the displacement of its partial immersion, thereby affording a simple mode of regulating the amount of water which it is desired that the tank shall supply at each pull. The lowering of the lever G has also caused the stop-cock P to open, allowing water to flow into the part C of the tank A. The water will gradually raise the float F until all the working parts again occupy the position shown by full lines in my drawings, and everything is ready for repeating the operation, as hereinabove described.

What I claim, and desire to secure by Letters Patent of the United States, is—

1. The combination, with a tank, A, having the unperforated dam B and unobstructed pipe E, float F, lever G, and pull-rod I, arranged substantially as described, of adjustable stop J, for regulating the amount of water discharged at each pull, in the manner herein set forth.

2. The combination, with the tank A, having an unperforated dam, B, and an unobstructed pipe, E, float F, lever G, pull-rope I, and stop J, arranged substantially as herein set forth, of link L, lever M, stop-cock P, pipe W, and pipe S, arranged to operate as and for the purpose herein specified.

P. G. HUBERT. [L. S.]

Witnesses:
 OTTO BAUMANN,
 C. W. J. HOOZLEF.